United States Patent [19]
Hayakawa et al.

[11] Patent Number: 4,896,561
[45] Date of Patent: Jan. 30, 1990

[54] LUBRICATING OIL SUPPLY DEVICE FOR TRANSMISSION MECHANISM

[75] Inventors: Yoichi Hayakawa, Toyoake; Tamotu Kobatake, Anjo; Kagenori Fukumura, Toyota; Seiichi Nishikawa, Toyokawa, all of Japan

[73] Assignees: Aisin-Warner Limited; Toyota Jidosha Kabushiki, both of Japan

[21] Appl. No.: 820,666

[22] Filed: Jan. 21, 1986

[30] Foreign Application Priority Data

Jan. 19, 1985 [JP] Japan ................................. 60-7785

[51] Int. Cl.$^4$ ............................................. F16H 57/02
[52] U.S. Cl. .................................. 74/606 R; 184/6.12; 184/6.3; 74/606 A
[58] Field of Search ................. 74/606 R, 606 A, 467; 210/222; 184/6.12, 6.30

[56] References Cited

U.S. PATENT DOCUMENTS

| | | | |
|---|---|---|---|
| 3,441,106 | 4/1969 | Taylor et al. | 74/607 |
| 4,271,717 | 6/1981 | Millward et al. | 74/606 R |
| 4,356,889 | 11/1982 | Teeter | 184/6.12 |
| 4,526,054 | 7/1985 | Ehrlinger | 74/606 R |
| 4,539,865 | 9/1985 | Yoneda et al. | 74/606 R |
| 4,699,249 | 10/1987 | Fujiura et al. | 474/91 |

FOREIGN PATENT DOCUMENTS

| | | | |
|---|---|---|---|
| 57-22455 | 2/1982 | Japan | 74/606 R |
| 59-13163 | 1/1984 | Japan | 74/606 R |

Primary Examiner—Vinh T. Luong
Attorney, Agent, or Firm—Steele, Gould & Fried

[57] ABSTRACT

A device for supplying lubricating oil in a transmission mechanism, the transmission mechanism comprising: an input shaft; an output shaft disposed parallel to the input shaft; a first rotary body provided on the input shaft; a second rotary body provided on the output shaft; a transmission member for interlocking the first rotary body with the second rotary body; and, a transmission mechanism case forming a transmission mechanism chamber separated from the exterior for housing the transmission mechanism; and, the lubricating oil supply device comprising: a partition wall assembly with an opening disposed in the transmission mechanism case chamber and defining an oil chamber to contain the lubricating oil scattered by the rotation of the transmission mechanism through the opening; and, a lubricating oil supply passage connected to the oil chamber to supply the transmission mechanism with lubricating oil, the passage being disposed at a level lower than the opening, whereby oil scattered by operation of the transmission mechanism is collected in the oil chamber and supplied to the transmission member through the passage whenever the oil in the oil chamber is at a level higher than the passage.

4 Claims, 2 Drawing Sheets

LUBRICATING OIL SUPPLY DEVICE FOR TRANSMISSION MECHANISM

BACKGROUND OF THE INVENTION

1. Field of the Invention

This invention relates to a device for supplying lubricating oil in a transmission mechanism, and in particular, to a lubricating oil supply device for a transmission mechanism in an automatic transmission for a motor vehicle.

2. Description of the Prior Art

A conventional chain transmission mechanism comprises: an input shaft; an output shaft disposed parallel to the input shaft; a first sprocket provided on the input shaft; a second sprocket provided on the output shaft; a chain for interlocking the first sprocket with the second sprocket; and, a transmission mechanism case forming a transmission mechanism chamber for housing the shafts, sprockets and chain. This type of transmission mechanism has been lubricated by stirring up lubricating oil collected in a bottom part of the transmission mechanism chamber by the rotation of the transmission mechanism.

The lubrication systems for such transmission mechanisms do not provide satisfactory lubrication. The amount of the lubricating oil scattered by the stirring increases with the rotational speed of the transmission mechanism, so that the oil level of the lubricating oil collected in the bottom part of the transmission mechanism chamber is lowered at higher speeds, which is apt to cause insufficient lubrication. The only solution known and practiced to avoid this problem, is to increase the amount of the lubricating oil to ensure sufficient lubrication even under high-speed rotation. Accordingly, the oil level becomes so high that the stirring of the lubricating oil itself is apt to cause an increase in the oil temperature and thereby lower transmission efficiency.

SUMMARY OF THE INVENTION

It is an object of this invention to provide a lubricating oil supply device for a transmission mechanism, which can efficiently supply lubricating oil to the transmission mechanism and, at the same time, can prevent the oil temperature from being raised by stirring of the lubricating oil.

This, and other objects of the invention are accomplished by a device for supplying lubricating oil in a transmission mechanism, the transmission mechanism comprising: an input shaft; an output shaft disposed parallel to the input shaft; a first rotary body provided on the input shaft; a second rotary body provided on the output shaft; a transmission member for interlocking the first rotary body with the second rotary body; and, a transmission mechanism case forming a transmission mechanism chamber separated from the exterior for housing the transmission mechanism; and, the lubricating oil supply device comprising: a partition wall in the transmission mechanism case defining an oil chamber to contain the lubricating oil scattered by the rotation of the transmission mechanism, the oil chamber having an opening; a radial oil passage formed in one of the first rotary body and the second rotary body; and, a lubricating oil supply passage communicating between the oil chamber and the radial oil passage. The lubricating oil supply device for a transmission mechanism according to invention, as recited above, has the following characteristic operation.

The lubricating oil scattered by the rotation of the transmission mechanism is collected in the oil chamber through the opening, is then fed into the interior of the rotary body by utilizing the pressure in the oil chamber, and is supplied from the interior of one of the rotary bodies to the transmission mechanism through the radial oil passage by centrifugal force (the common designation for inertial force due to centripetal acceleration). The pressure in the oil chamber and the centrifugal force acting on the lubricating oil fed into the interior of the rotary body tend to increase automatically with the rotational speed of the transmission mechanism. It is therefore possible to automatically supply the lubricating oil efficiently in correspondence with the rotational speed of the transmission mechanism, and at the same time, to reduce the rise in the oil temperature and the consequent lowering in the transmission efficiency which would otherwise arise from needless stirring and scattering of the lubricating oil.

Other and further objects, features and advantages of this invention will be apparent from the following detailed description.

BRIEF DESCRIPTION OF THE INVENTION

For the purpose of illustrating the invention there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
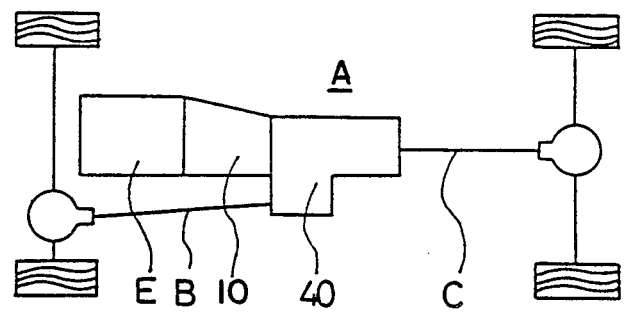
FIG. 1 shows a schematic illustration of a four-wheel-drive vehicle incorporating this invention.
Figure 2:
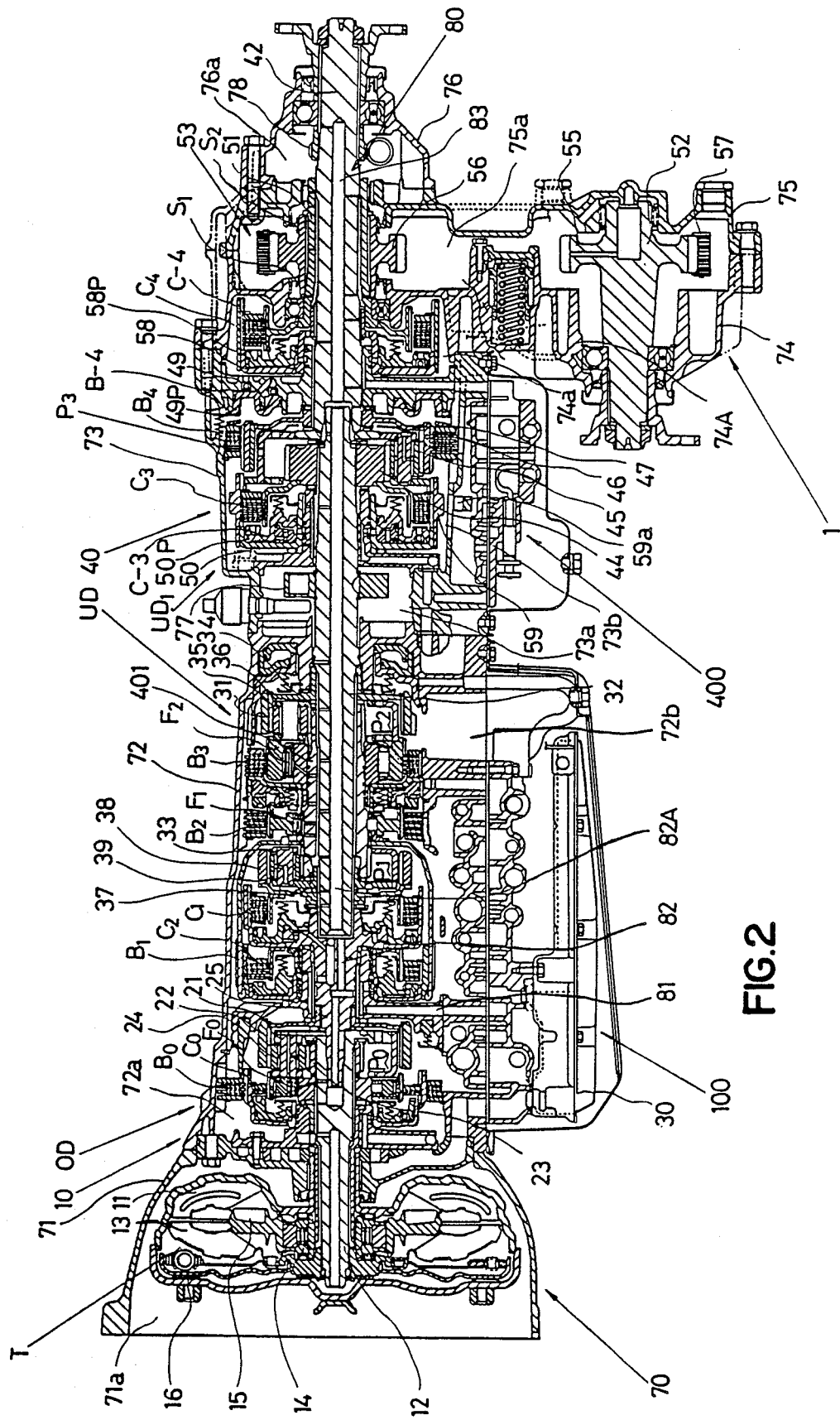
FIG. 2 shows a cross-sectional view through the torque converter and transmission of the vehicle shown in FIG. 1; and, FIG. 3 shows an enlarged cross-sectional view of an essential part of the lubricating oil supply device for a transmission mechanism according to this invention, corresponding to the lower right hand portion of FIG. 2.

Referring to FIG. 1 and FIG. 2, a lubricating oil supply device for a transmission mechanism is utilized in a four-wheel-drive vehicle A. Vehicle A comprises an engine E, a four-speed automatic speed change gear mechanism 10 with overdrive OD which functions as a main speed change gear, a four-wheel-drive transfer 40 functioning as an auxiliary speed change gear and connected to an output shaft 32 of the automatic speed change gear mechanism 10, a four-wheel-drive speed change gear case 70 housing the foregoing transmission components and a torque converter, and a lubricating oil supply mechanism 80.

The four-wheel-drive transfer 40 is coupled to the four-speed automatic speed change gear mechanism 10, mechanism 10 being coupled to the engine E. A first output shaft 42 of transfer 40 is connected to a propeller shaft C for driving the rear wheels, and a second output shaft 52 of transfer 40 is connected to a propeller shaft B for driving the front wheels.

The four-speed automatic speed change gear 10 comprises a fluid torque converter T, an overdrive mechanism OD, and a 3-forward-stage 1-backward-stage underdrive mechanism UD.

The torque converter T comprises a pump 11 connected to the output shaft of the engine E, a turbine 13 connected to an output shaft 12 of the torque converter T, a stator 15 connected to a fixed part through a one-way clutch 14, and a direct-connection clutch 16. The output shaft 12 of the torque converter T constitutes an input shaft for the overdrive mechanism OD.

The overdrive mechanism OD comprises a multiple-disk clutch $C_O$, a multiple-disk brake $B_O$ and a one-way clutch $F_O$, which are frictional engagement elements. The OD mechanism also comprises a planetary gear set $P_O$ in which component elements are releasably engaged with a fixed member, such as the speed change mechanism case; or connected to the input shaft, the output shaft or other component element. The fixing or connection is released by the selective engagement of the frictional engagement elements.

The planetary gear set $P_O$ comprises a carrier 21 connected to the input shaft 12, a ring gear 22 connected to the output shaft 25 of the overdrive mechanism OD, a sun gear 23 which is rotatably externally fitted to the input shaft 12, and a planetary pinion rotatably supported on the carrier 21 and meshed with the sun gear 23 and the ring gear 22. Sun gear 23 engages the speed change gear case 70 through the brake $B_O$ and is connected to the carrier 21 through the clutch $C_O$ and the one-way clutch $F_O$ disposed in parallel with the clutch $C_O$.

The output shaft 25 of the overdrive mechanism OD serves also an an input shaft for the 3-forward-stage 1-backward-stage underdrive mechanism UD.

The underdrive mechanism UD comprises multiple-disk clutches $C_1$ and $C_2$, a belt brake $B_1$, multiple-disk brakes $B_1$ and $B_3$ and one-way clutches $F_1$ and $F_2$, which are frictional engagement elements, as well as a front-stage planetary gear set $P_1$ and a rear-stage planetary gear set $P_2$.

The front-stage planetary gear set $P_1$ comprises a ring gear 31 connected to the shaft 25 through the clutch $C_1$, a carrier 33 connected to the output shaft 32, a sun gear 34 which is connected to the input shaft 25 through the clutch $C_2$ and is fixed to the speed change gear case 70 through the belt brake $B_1$, and a planetary pinion 35 rotatably supported on the carrier 33 and meshed with the sun gear 34 and the ring gear 31. The belt brake $B_2$ is disposed in parallel with the belt brake $B_1$ and the one-way clutch $F_1$ is disposed in series with the brake $B_2$. The rear-stage planetary gear set $P_2$ comprises a carrier 36 fixed to the speed change gear case through the brake $B_3$ and the one-way clutch $F_2$ (disposed in parallel with the brake $B_3$), a sun gear 37 provided as one body with a sun gear shaft 401 together with the sun gear 34 of the four-stage planetary gear set $P_1$, a ring gear 38 connected to the output shaft 32, and a planetary pinion 39 rotatably supported on the carrier 36 and meshed with the sun gear 37 and the ring gear 38.

A shift lever (not shown) for a main speed change gear, which is provided at the driver's seat for the control of a main hydraulic controller 100 provided at a lower part of the four-speed automatic speed change gear 10 and contained in an oil pan 30, has main shift positions MSP for the ranges of P (parking), R (reverse), N (neutral), D (drive), S (second) and L (low). The relationships between the set ranges of the main shift positions MSP, the speed change stages of the fourth speed (4), the third speed (3), the second speed (2) and the first speed (1) and the operating conditions of the clutches ($C_1$, $C_2$, $C_3$) and the brakes ($B_1$, $B_2$, $B_3$, $B_4$) and the one-way clutches ($F_1$, $F_2$, $F_O$), are shown in Table 1. In Table 1, the letter "E" indicates an engaged condition, and the letter "X" indicates a disengaged condition. The designation "L" indicates that, although the corresponding one-way clutch is engaged in an engine drive condition, the engagement is not necessarily required, because the transmission of power is effected by a clutch or brake disposed in parallel with the one-way clutch (locked condition). The designation "(L)" indicates that the corresponding one-way clutch is engaged only in the engine drive condition and is not engaged in an engine brake condition. The letter "f" indicates that the corresponding one-way clutch is free.

TABLE 1

| MSP | | $C_1$ | $C_2$ | $C_3$ | $B_1$ | $B_2$ | $B_3$ | $B_0$ | $F_1$ | $F_2$ | $F_0$ |
|---|---|---|---|---|---|---|---|---|---|---|---|
| P | | X | X | E | X | X | X | X | f | f | f |
| R | | X | E | E | X | X | E | X | f | f | f |
| N | | X | X | E | X | X | X | X | f | f | f |
| D | 1 | E | X | E | X | X | X | X | f | L | (L) |
|   | 2 | E | X | E | X | E | X | X | L | f | (L) |
|   | 3 | E | E | E | X | E | X | X | f | f | (L) |
|   | 4 | E | E | X | X | E | X | E | f | f | f |
| S | 1 | E | X | E | X | X | X | X | f | L | (L) |
|   | 2 | E | X | E | E | E | X | X | (L) | f | (L) |
|   | 3 | E | E | E | X | E | X | X | f | f | (L) |
|   | (3) | E | E | E | X | E | X | X | f | f | (L) |
| L | 1 | E | X | E | X | X | E | X | f | (L) | (L) |
|   | 2 | E | X | E | E | E | X | X | (L) | f | (L) |
|   | (1) | E | X | E | X | X | E | X | f | (L) | (L) |

The transfer 40 comprises a clutch $C_3$ and a brake $B_4$, which are frictional engagement elements, a clutch $C_4$ which is a two-wheel/four-wheel change-over mechanism, an input shaft formed by the output shaft for the planetary gear sets $P_1$ and $P_2$, a first output shaft 42 disposed in series with the input shaft 32, a planetary gear set Pf disposed between the input shaft 32 and the first output shaft 42, a four-wheel-drive sleeve 51 rotatably externally fitted to the first output shaft 42 and serving as in input shaft for a transmission mechanism, a second output shaft 52 which is disposed in parallel with the input shaft 32, is fitted in the direction opposite to the first output shaft 42 and serves as an output shaft for the transmission mechanism, and the transmission mechanism 53 comprising the sleeve 51, the second output shaft 52 and other component elements.

The planetary gear set Pf comprises a sun gear 44 spline-fitted to an end part of the input shaft 32, a planetary pinion 45 meshed with the sun gear 44, a ring gear 46 meshed with the planetary pinion 45, and a carrier 47 rotatably supporting the planetary pinion 45 and connected to the tip of the first output shaft 42 of the transfer 40. The brake $B_4$ is a multiple-disk friction brake for engaging the ring gear 46 to the speed change gear case 70, and is operated by a hydraulic servo B-4. Servo B-4 comprises a cylinder 49 formed in the speed change gear case 70 and a piston 49P fitted in the cylinder 49. The clutch $C_3$ is disposed on the four-speed automatic speed change gear mechanism 10 side of the planetary gear set Pf so as to effect engagement and disengagement of the sun gear 44 and the carrier 47, and is operated by a hydraulic servo C-3. Servo C-3 comprises a cylinder 50 connected to the carrier 47 and a piston 50P fitted in the cylinder 50. The planetary gear set Pf, the brake $B_4$ and the clutch $C_3$ constitute a speed reduction mechanism $UD_1$.

The clutch $C_4$ is a multiple-disk friction clutch for engagement and disengagement of the first output shaft 42 connected to the carrier 47 and the sleeve 51 connected to a sprocket 56 provided on one side of the transmission mechanism 53 for driving the second output shaft 52 of the transfer 40, and is operated by a hydraulic servo C-4. Servo C-4 comprises a cylinder 58 rotatably supported by the speed change gear case 70 and a piston 58P fitted in the cylinder 58.

The transmission mechanism 53 comprises the first sprocket 56, which is the first rotary body spline-fitted to the sleeve 51, a second sprocket 55, which is the second rotary body formed as one body with the output shaft 52, and a chain 57, which is the transmission member fitted between the sprocket 55 and the sprocket 56.

A parking gear 59 is provided on the outer periphery side of the cylinder 50 of the hydraulic servo C-3, and a holdfast 59a is meshed with the parking gear 59 to fix the first output shaft 42 when the shift lever of the four-speed automatic speed change gear 10 is selectively shifted to a parking position.

In normal condition, a line pressure supplied to the hydraulic controller for the automatic speed change gear is supplied to the hydraulic servo C-3 to engage the clutch $C_3$, while the pressures in the hydraulic servo B-4 and the clutch C-4 are relieved to release the brake $B_4$ and the clutch $C_4$. As a result, the sun gear 44 and the carrier 47 in the planetary gear set Pf are connected to each other, and power is transmitted from the input shaft 32 to only the first output shaft 42 with a reduction gear ratio of 1, resulting in two-wheel-drive running in which only the rear wheels are driven by the engine. In this case, the power supplied from the input shaft 32 is transmitted to the first output shaft 42; not through the sun gear 44, planetary pinion 45 or the ring gear 46, but through the clutch $C_3$ and the carrier 47, so that no load is applied to the tooth surfaces of each of the gears, and the useful life of the gears is prolonged.

When four-wheel-drive running is required during the course of two-wheel-drive running, the shift lever for the transfer 40, which is a speed selection means provided at the driver's seat or the like, is manually shifted, and the line pressure is gradually supplied to the hydraulic servo C-4 for a transfer controller 400 to smoothly engage the clutch $C_4$, whereby the first output shaft 42 and the sleeve 51 are connected, and the power is also transmitted to the front wheels through the transmission mechanism 53, the second output shaft 52 and the propeller shaft B for driving the front wheels (shown in FIG. 1). Accordingly, the power is transmitted from the input shaft 32 to the first output shaft 42 and the second output shaft 52 with a reduction gear ratio of 1, resulting in a direct-connected four-wheel-drive running condition (high-speed four-wheel-drive condition).

When the shift lever is manually shifted under the necessity of increasing the output torque, as on a steep slope, during the four-wheel-drive running, the hydraulic pressure supplied to the hydraulic servo actuates a change-over valve for switching between the high-speed four-wheel-drive condition and the low-speed four-wheel-drive condition, thereby gradually supplying the line pressure to the hydraulic servo B-4 and relieving the hydraulic pressure in the hydraulic servo C-3 at an appropriate timing, whereby the brake $B_4$ is gradually engaged and the clutch $C_3$ is smoothly released. As a result, the sun gear 44 and the carrier 47 are released, while the ring gear 46 is fixed, and the power is transmitted from the input shaft 32 to the first output shaft 42 and the second output shaft 52 with a speed reduction through the sun gear 44, the planetary pinion 45 and the carrier 47. Thus, a four-wheel-drive speed-reduction running condition (low-speed four-wheel-drive condition) with a high torque is obtained.

The shift lever (not shown) for the transfer 40, provided at the driver's seat, has sub shift positions SSP for the ranges of H2 (direct-connected two-wheel-drive), H4 (direct-connected four-wheel-drive) and L4 (four-wheel-drive with speed reduction). The relationships between the set ranges of the sub shift positions SSP, the engagement or disengagement of the brake $B_4$ and the clutches $C_3$ and $C_4$ and the running condition of the vehicle are shown in Table 2. As in Table 1, the letter "E" indicates that the corresponding clutch or brake is engaged, and the letter "X" indicates that the corresponding clutch or brake is released (disengaged).

TABLE 2

| SSP | $C_3$ | $B_4$ | $C_4$ | Running condition |
|-----|-------|-------|-------|-------------------|
| H2  | X     | E     | X     | L2                |
| H4  | E     | X     | E     | H4                |
|     | X     | E     | E     | L4                |
| L4  | E     | X     | E     | H4                |
|     | X     | E     | E     | L4                |

The speed change gear case 70 comprises a torque converter housing 71 forming a torque converter chamber 71a for containing the torque converter T, an overdrive mechanism chamber 72a for containing the overdrive mechanism OD, a transmission case 72 forming an underdrive mechanism chamber 72b for containing the underdrive mechanism UD, an extension housing 73 forming an input-side chamber 73a for containing an electronically controlled vehicle speed sensor 77 and also forming a speed reduction mechanism chamber 73b for containing the speed reduction mechanism $UD_1$, a front transmission mechanism case 74 forming a change-over mechanism chamber 74a for containing the clutch $C_4$, a rear transmission mechanism case 74 which together with the front transmission case 74 forms a transmission mechanism chamber 75a for containing the transmission mechanism 53, and an extension housing 76 forming a rear chamber 76a for containing a speedometer drive gear 78 and also forming a rear cover for the speed change gear case 70.

The lubricating oil supply mechanism 80 comprises a lubricating oil output passage 81 extending from the main hydraulic controller 100, an axial oil passage 82 provided in the output shaft 25 and communicating with the lubricating oil output passage 81, an axial oil passage 83 provided in the first output shaft 42 and communicating with the axial oil passage 82 through an axial oil passage 82A provided in the input shaft 32, and a plurality of radial oil passages communicating with the above-noted oil passages, by which components of the four-speed automatic speed change gear mechanism 10 and the transfer 40 are lubricated. The mechanism 80 further comprises a lubricating oil supply device 1 for the transmission mechanism, which is provided in the transmission mechanism cases 74 and 75, separated from the other chambers by oil seals $S_1$ and $S_2$.

Figure 3:
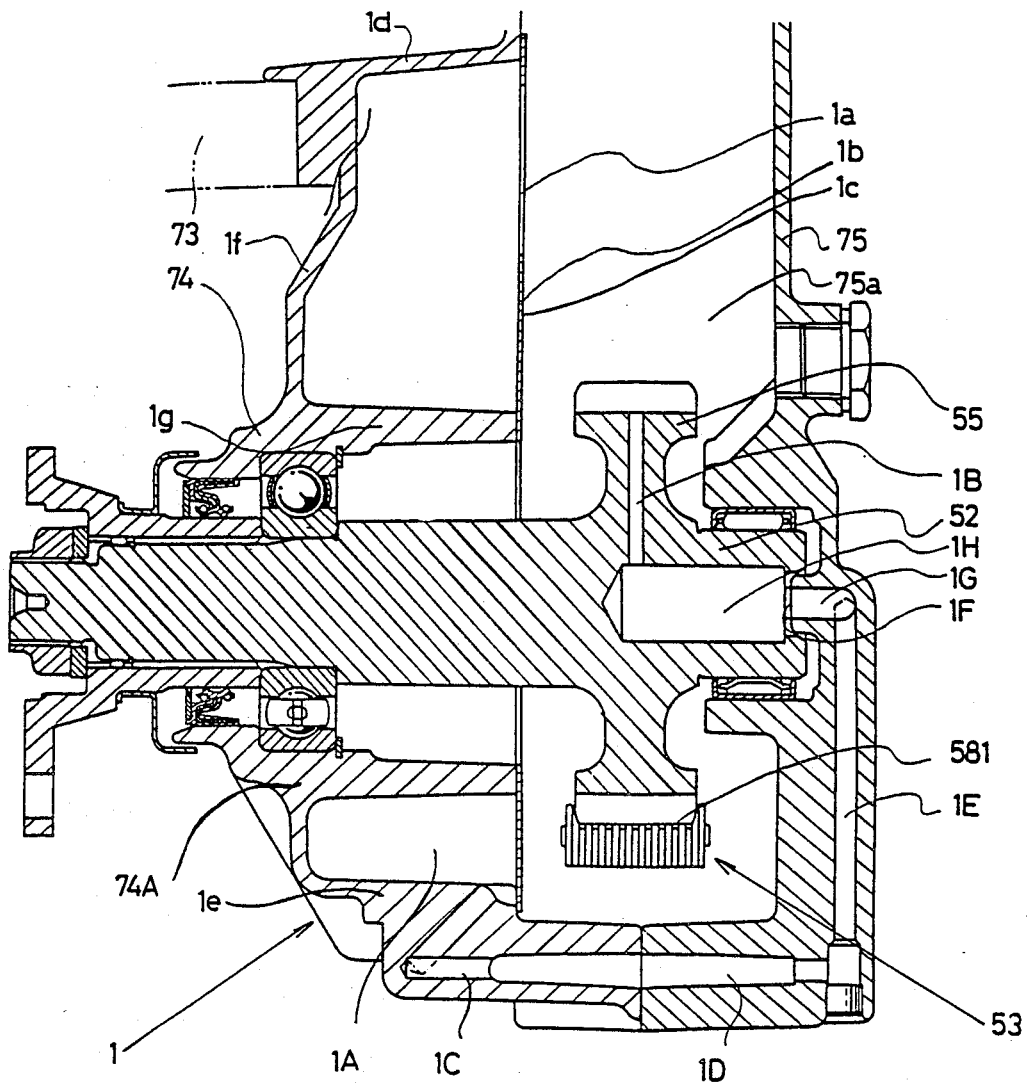

With reference to FIG. 3, the lubricating oil supply device 1 for the transmission mechanism comprises an oil chamber 1A provided in an annular shape around the second output shaft 52 so as to contain the lubricating oil scattered by the rotation of the transmission mechanism 53 and thereby lower the oil level in the transmission mechanism chamber 75a. The oil chamber 1A is defined by partition wall assembly, comprising: a partition wall 74A and an annular plate 1b. Annular plate 1b is provided with an opening 1a at an upper part thereof. The partition wall 74A comprises an upper wall 1d, a lower wall 1e, a side wall 1f connecting the upper wall 1d with the lower wall 1e, and an intermediate tubular wall 1g projecting from the side wall 1f to the inside of the transmission mechanism chamber 75a, the walls being formed on the front transmission mechanism case 74. A radial oil passage 1B is provided in the interior of the second sprocket 55 to forcibly supply the lubricating oil to a meshing part 581 of the second sprocket 55 and the chain 57. A lubricating oil supply passageway communicates between the oil chamber 1A and the radial oil passage 1B. The passageway comprises an oil passage 1C formed in the front transmission case 74, an oil passage 1D formed in the rear transmission mechanism case 75 and communicating with the oil passage 1C, an oil passage 1G communicating with the oil passage 1D through the oil passage 1E and provided with an opening 1F on the input side (the left side in the figure), and an oil passage 1H provided in the second output shaft 52 to communicate between the oil passage 1G and the radial oil passage 1B.

Although a chain is utilized in the transmission mechanism in the illustrated embodiment, the lubricating oil supply device for a transmission mechanism according to this invention can also be applied to other methods of transmitting power, for example, through the meshing of gears.

This invention may be embodied in other specific forms without departing from the spirit or essential attributes thereof. Accordingly, reference should be made to the appended claims, rather than the foregoing specification, as indicating the scope of the invention.

What is claimed is:

1. A power transmission for an engine, comprising:
    a transmission mechanism, having: an input shaft, an output shaft disposed parallel to said input shaft, a first rotary body disposed on said input shaft, a second rotary body disposed on said output shaft, and a transmission member for interlocking said first rotary body with said second rotary body;
    a transmission mechanism case forming a transmission mechanism chamber for housing said transmission mechanism, the transmission member being lubricated by a lubricating oil in said chamber; and,
    a lubricating oil supply mechanism, comprising:
        a partition wall assembly disposed in said transmission mechanism chamber and defining an oil chamber to contain lubricating oil, said partition wall assembly having an opening to receive lubricating oil scattered therethrough by operation of said transmission mechanism; and,
        lubricating oil supply passages for lubricating said transmission member, including a first oil passage connected between said oil chamber and said output shaft, a second oil passage in said output shaft communicating with said first oil passage and a radial oil passage in said second rotary body communicating with said second oil passage,
    whereby lubricating oil scattered by operation of said transmission mechanism is collected in said oil chamber through said opening and lubricating oil in said oil chamber is supplied to said transmission member through said lubricating oil supply passages.

2. A power transmission according to claim 1, wherein said partition wall assembly comprises an annular plate in which said opening is formed.

3. A power transmission according to claim 1, wherein said transmission member comprises a chain.

4. A power transmisison according to claim 1, wherein said first oil supply passage is formed in part integrally with said transmission case.

* * * * *